Aug. 15, 1961     D. M. HARVEY     2,995,946
DISPLACEABLE MOUNT FOR GEARING
Filed April 4, 1960
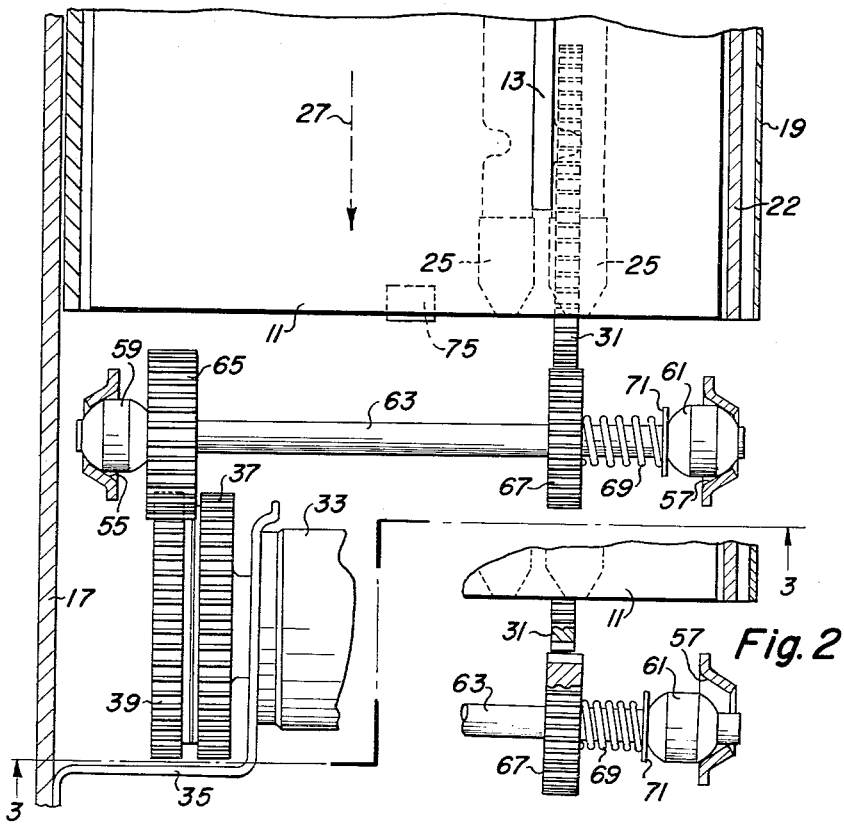
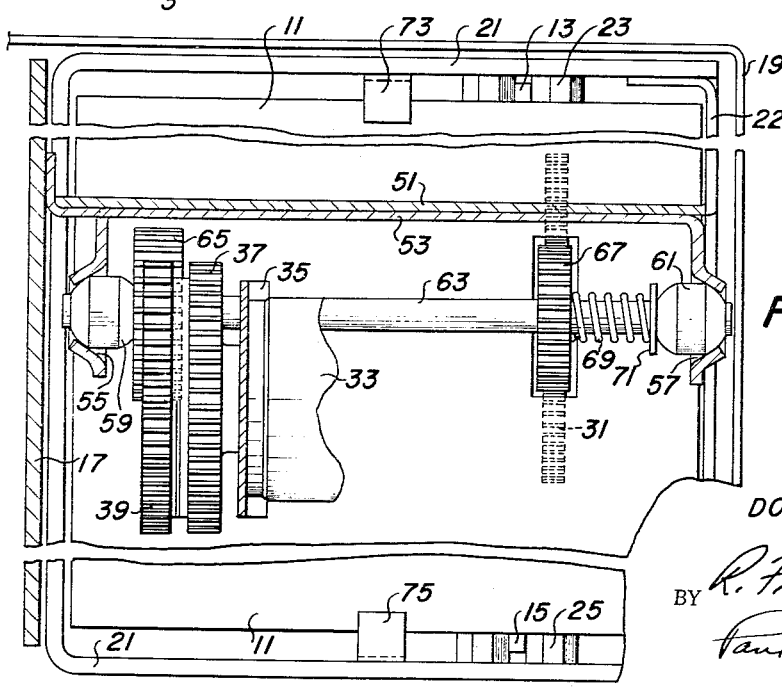
DONALD M. HARVEY
INVENTOR
BY *R. Frank Smith*
*Paul R. Holmes*
ATTORNEYS

United States Patent Office 2,995,946
Patented Aug. 15, 1961

2,995,946
DISPLACEABLE MOUNT FOR GEARING
Donald M. Harvey, Rochester, N.Y., assignor to Eastman Kodak Company, Rochester, N.Y., a corporation of New Jersey
Filed Apr. 4, 1960, Ser. No. 19,590
7 Claims. (Cl. 74—411)

This invention relates to a displaceable mount for gearing and more particularly to an apparatus which permits displacement of one gear with respect to another upon clashing of the gears.

It is well known that upon initial engagement of gears it sometimes occurs that the teeth of the gears are not positioned to mesh properly. Jamming may occur and torque cannot be transmitted by the gears. In some instances, unless relieved, the clashing engagement of the gears causes the gear teeth to break and/or the mounts for the gears to be seriously damaged. The term "clashing" as used throughout this specification and in the claims is intended to define the abutting tooth to tooth engagement of two gears as contrasted to "meshing" in which the gear teeth are correctly engaged.

The displaceable mount for gearing of the present invention will be described in connection with its use in a photographic apparatus of the type which includes a separable film unit. The photographic apparatus comprises a photographing station, through which documents are advanced and illuminated, and an exposure station in the film unit in which the images of the illuminated documents are recorded. The film unit contains a supply of film, means for advancing the film and means for focusing the document images on the film. A gear train in the film unit is utilized to advance the film in the film unit. The first gear of the gear train is engaged and driven through another gear mounted in the photographic apparatus. In order to prevent damage to the gears in the event of clashing during insertion of the film unit in the apparatus, one of the gears and the shaft on which it is carried, is mounted for displacement from its normal position. The displaceable mount for gearing of the present invention can be utilized with equal effectiveness in any type of apparatus where clashing of two gears may occur and therefore the following description is intended to be illustrative only.

The displaceable mount for gearing of the present invention comprises broadly, means for mounting a shaft carrying one of two meshing gears for pivotable movement about an axis different from the rotational axis of the shaft, and means for normally supporting the shaft and one gear in a position at which the gear is in meshing engagement with the other gear, and for supporting the shaft and one gear in another position upon clashing engagement of the gears.

The primary object of the present invention is therefore to provide a displaceable mount for gearing which will prevent damage to the teeth of gears and their mountings in the event of clashing engagement of the gears.

Another object of the present invention is to provide an apparatus for facilitating the meshing engagement of gears.

Yet another object of the present invention is to provide a displaceable mount for gearing which will prevent damage from occuring to gear teeth upon clashing engagement with other gear teeth, which is relatively simple to manufacture, which is reliable in use and which is inexpensive to produce.

Still other objects and advantages of the present invention will become readily apparent to those skilled in the art from the following description with reference to the drawing in which like characters denote like parts and wherein:

FIG. 1 is a plan view of the displaceable mount for gearing of the present invention;

FIG. 2 is a view similar to FIG. 1 but showing the displaced position taken by the parts upon clashing engagement of the gears; and FIG. 3 is an elevation view taken along lines 3—3 of FIG. 1.

In the drawings, the numeral 11 designates a film unit which, as known to those skilled in the photographic art, includes mechanism and film strip for sequentially recording images directed thereto from the photographing station (not shown) in the photographic apparatus, by way of suitable mirrors and lenses (not shown). Film unit 11 is formed with a flange 13 on the top surface thereof and with a flange 15 on the bottom surface. Flanges 13 and 15 extend throughout a portion of the length of the film unit and guide the film unit into operating position in the apparatus as will be hereinafter set forth. The numeral 17 designates a portion of the frame of the photographic apparatus. Cover 19 is mounted on frame 17 by suitable means (not shown). A U-shaped channel 21 with a side support 22 is carried on frame 19. An upper track 23 and a lower track 25 are mounted in channel 21 as best illustrated in FIG. 3 to guide flanges 13 and 15, respectively during movement of the film unit 11 into operating position in the photographic apparatus. The film unit during such movement enters through a front opening (not shown) in cover 19 and progresses in the direction of the arrow 27 indicated in FIG. 1 until in its operating position. Spur gear 31 is mounted for rotation about a fixed axis within the film unit 11, and as will be noted in FIG. 1, gear 31 extends beyond the rear surface of the film unit. It is through gear 31 that the gear train (not shown) which controls the film advance is driven. Gear trains as well as the specific structure of the film unit are well known in the art and, since they do not form a part of the present invention, will not be described herein.

The photographic apparatus includes an electromagnetic clutch 33 which is carried on a bracket 35 mounted on frame 17. Clutch 33 includes a drive gear 37 and an idler gear 39. Drive gear 37 is continuously driven through a gear (not shown) in engagement therewith by an electric motor (not shown) in the photographic apparatus. Upon energizing clutch 33 idler gear 39 is interconnected with drive gear 37 and is driven in synchronism with gear 37. A sub frame 51 and U-shaped bracket 53 are also mounted on frame 17. The bracket 53 is provided with conical seats 55 and 57 on the opposed legs thereof for receiving spherical bearings 59 and 61 respectively. Bearing 59 is rigidly mounted on shaft 63 adjacent to one end thereof. Bearing 61 is mounted on the other end of shaft 63 for axial movement with respect to shaft 63. A spur gear 65 is fixed on shaft 63 adjacent to bearing 59 and is in meshing engagement with the idler gear 39. Another spur gear 67 is rigidly mounted on shaft 63 adjacent to bearing 61 in a position at which it is engaged by gear 31 when the film unit 11 is in its operating position. A helical compression spring 69 is positioned between the gear 67 and a washer 71 which is free to move axially along shaft 63 and faces against bearing 61. It will be noted that the openings provided in the conical seats 55 and 57 are substantially larger than the diameter of shaft 63 but are, of course, not so large that the bearings 59 and 61, respectively would be able to pass through the openings. Stops 73 and 75 are provided on channel 21 to prevent the film unit 11 from being inserted beyond its operating position in the photographic apparatus.

The operation of the displaceable mount for gearing of the present invention will now be described. To place the film unit 11 in the photographic apparatus the flanges 13 and 15 of film unit 11 are aligned with tracks 23 and 25, respectively at the front opening of the apparatus and the film unit 11 is guided by the tracks to the point where the teeth of gear 31 start to engage the teeth of gear 67. If the teeth of these gears happen to be positioned such that meshing engagement occurs, the shaft 63 and bearings 59 and 61 remain centered with respect to the seats 55 and 57 as illustrated in FIG. 1, the rear of the film unit engages stops 73 and 75 and torque may be transmitted through gears 67 and 31. The film unit 11 is then in its operating position. The effect of spring 69 is to maintain the bearings 59 and 61 and shaft 63 centered in the seats 55 and 57 respectively.

If, on the other hand, the teeth of gear 31 clash with the teeth of gear 67 as film unit 11 is guided into operating position by tracks 23 and 25, the movement of the film unit between the clashing engagement of the gears and the final position determined by stops 73 and 75 pivots shaft 63 about bearing 59 in seat 55 to the position illustrated in FIG. 2. During this pivoting movement, a portion of the surface of seat 57 is in sliding contact with the spherical surface of bearing 61 and causes the bearing to move axially along shaft 63 toward gear 67 against the force of spring 69. The size of the opening in seat 57 is, as mentioned above, sufficiently large to accommodate the pivotal movement of shaft 63 as illustrated in FIG. 2, but, by the same token, does not permit the shaft to drop completely out of the seat 57. In order to relieve the forces which might otherwise, upon clashing of gears 31 and 67, damage the teeth or mounts thereof, the diameter of the opening in seat 57 is sufficiently large to permit a movement of shaft 63 by an amount which at the point of engagement between the gears 31 and 67 is equal to or greater than the depth of the teeth on the gears. Since gear 65 is carried by shaft 63 at a position close to bearing 59, the total displacement of the shaft at that point is sufficiently small that the teeth of gear 65 merely move into closer proximity to the teeth of gear 39 and no damage will occur to gears 65 and 39 resulting from the pivotal movement of shaft 63 during clashing of gears 31 and 67.

It will now be appreciated by those skilled in the art that the displaceable mount for gearing of the present invention is relatively simple and inexpensive to manufacture, that it facilitates the meshing engagement of gears and furthermore that it prevents damage to the gears and their associated mounts upon clashing engagement of the gears. While only one embodiment of the present invention has been shown and described, many modifications and other applications thereof are possible and will be readily apparent to those skilled in the art. Therefore, the foregoing description is intended to be illustrative only and the scope of the invention is defined in the appended claims.

Having now particularly described my invention what I desire to secure by Letters Patent of the United States and what I claim is:

1. Apparatus for mounting one gear for displacement with respect to another gear upon clashing engagement thereof comprising a rotatable shaft on which said one gear is mounted, means operatively connected to said shaft for mounting the shaft for pivotal movement about an axis different from the rotational axis thereof, bearing means including a first bearing member and a first seat member for supporting said shaft and said one gear in a first position in which said gears are in meshing engagement and in a second position in which said shaft is displaced about said different axis upon clashing engagement of said gears, one of said members being slidably mounted on said shaft for axial movement with respect thereto and the other member being mounted in said apparatus, and means for resiliently urging said first bearing member into aligned engagement with said first seat member to support said shaft and said one gear in said first position.

2. Mounting apparatus in accordance with claim 1 wherein said first bearing member is slidably mounted on said shaft for axial movement with respect thereto and said first seat member is fixed in said apparatus, and wherein said urging means is carried by said shaft and biases said first bearing member axially with respect to said shaft into aligned engagement with said first seat member.

3. Mounting apparatus in accordance with claim 2 wherein said bearing means is of the self-centering type and upon movement of said shaft and gear to said second position, said seat member axially moves said first bearing member along said shaft in opposition to said urging means as a result of the camming engagement of a part of the first seat member with said first bearing member.

4. Mounting apparatus in accordance with claim 3 wherein said different axis intersects said rotational axis.

5. Mounting apparatus in accordance with claim 4 wherein said mounting means comprises a second bearing member in engagement with a second seat member one of which is carried on said shaft and the other of which is mounted in said apparatus.

6. Mounting apparatus in accordance with claim 5 wherein said second bearing member is a spherical bearing mounted on said shaft and said second seat member is a spherical bearing seat rigidly mounted in said apparatus which together form a universal joint for supporting said shaft.

7. Mounting apparatus in accordance with claim 6 wherein said first and second bearing members are mounted on said shaft adjacent to the ends thereof and wherein said first and second seat members are spaced in said apparatus in aligned opposed relation.

References Cited in the file of this patent

UNITED STATES PATENTS

| | | |
|---|---|---|
| 603,375 | Dunn | May 3, 1898 |
| 2,397,777 | Colman | Apr. 2, 1946 |